US010724638B2

(12) United States Patent
Bartha et al.

(10) Patent No.: US 10,724,638 B2
(45) Date of Patent: **\*Jul. 28, 2020**

(54) APPARATUS TO PROTECT SEALING SURFACES OF THIEF HATCHES

(71) Applicant: Emerson Process Management Regulator Technologies Tulsa, LLC, Tulsa, OK (US)

(72) Inventors: Istvan Bartha, Odorheiu-Secuiesc (RO); Cristian Amza, Cluj-Napoca (RO); John Cockerham, Tulsa, OK (US); Vlad Cristinel Hanceanu, Apahida (RO); Silviu Vasile Rebreanu, Cluj-Napoca (RO)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/197,706

(22) Filed: Nov. 21, 2018

(65) Prior Publication Data

US 2019/0093770 A1     Mar. 28, 2019

Related U.S. Application Data

(63) Continuation of application No. 15/470,501, filed on Mar. 27, 2017, now Pat. No. 10,161,521.

(51) Int. Cl.
*B62D 25/00* (2006.01)
*F16J 13/16* (2006.01)
(Continued)

(52) U.S. Cl.
CPC ............. *F16J 13/16* (2013.01); *B65D 47/32* (2013.01); *E05B 65/001* (2013.01); *E06B 5/12* (2013.01);
(Continued)

(58) Field of Classification Search
CPC .......... F16K 17/19; F16K 17/36; F16K 13/18; F16K 13/24; F16K 13/00; F16K 15/06;
(Continued)

(56) References Cited

U.S. PATENT DOCUMENTS

| 1,666,935 A | 4/1928 | Howell |
| 2,928,413 A | 3/1960 | Hansen |

(Continued)

FOREIGN PATENT DOCUMENTS

| WO | 2004036096 | 4/2004 |
| WO | 2017049058 | 3/2017 |

OTHER PUBLICATIONS

International Searching Authority, "International Search Report," issued in connection with International Patent Application PCT/US2018/023237, dated Jun. 6, 2018, 7 pages.

(Continued)

*Primary Examiner* — Jerry E Redman
(74) *Attorney, Agent, or Firm* — Hanley, Flight & Zimmerman, LLC

(57) ABSTRACT

Apparatus to protect sealing surfaces of thief hatches are disclosed. An example apparatus includes a first portion that is attachable to a tank, wherein the first portion includes a first opening, and a second portion that is pivotably coupled to the first portion. The example apparatus is structured to provide access to an aperture in the tank via the first opening when the second portion is in an open state and maintain a pressure of the tank within a specified range by selectively separating one or more seals from one or more corresponding sealing surfaces when the second portion is in a closed state, wherein the second portion includes the one or more seals and the one or more corresponding sealing surfaces.

18 Claims, 4 Drawing Sheets

(51) Int. Cl.
*F16K 17/04* (2006.01)
*E05B 65/00* (2006.01)
*E06B 5/12* (2006.01)
*E06B 7/18* (2006.01)
*F16J 13/24* (2006.01)
*B65D 47/32* (2006.01)
*F16J 13/18* (2006.01)
*F16K 17/19* (2006.01)
*F16K 24/04* (2006.01)
*F16K 24/06* (2006.01)

(52) U.S. Cl.
CPC ............... *E06B 7/18* (2013.01); *F16J 13/18* (2013.01); *F16J 13/24* (2013.01); *F16K 17/042* (2013.01); *F16K 17/19* (2013.01); *F16K 24/04* (2013.01); *F16K 24/06* (2013.01)

(58) Field of Classification Search
CPC ... B65D 47/32; E06B 7/18; E06B 5/12; E06B 65/001
USPC ........................................................ 296/97.22
See application file for complete search history.

(56) References Cited

U.S. PATENT DOCUMENTS

| | | | |
|---|---|---|---|
| 4,498,600 A | 2/1985 | Blion | |
| 4,555,041 A * | 11/1985 | Muehl | F16K 17/196 137/43 |
| 4,676,390 A | 6/1987 | Arris | |
| 5,048,553 A * | 9/1991 | VanDeVyvere | F16K 17/36 137/43 |
| 5,246,027 A * | 9/1993 | Morris | B65D 90/34 137/43 |
| 5,385,256 A | 1/1995 | Brown | |
| 5,829,620 A | 11/1998 | Harris et al. | |
| 5,967,358 A * | 10/1999 | Adams | B65D 90/10 105/377.05 |
| 6,305,412 B1 | 10/2001 | Steele | |
| 6,321,801 B1 | 11/2001 | Hagano et al. | |
| 6,431,228 B2 | 8/2002 | Foltz et al. | |
| 6,474,376 B2 | 11/2002 | Hagano et al. | |
| 6,478,360 B1 | 11/2002 | Reutter | |
| 6,866,161 B2 | 3/2005 | Hagano | |
| 7,740,301 B2 | 6/2010 | Hirano | |
| 8,807,369 B2 | 8/2014 | Sasaki | |
| 8,905,768 B2 | 12/2014 | Hara | |
| 9,266,428 B2 | 2/2016 | Kobayashi | |
| 9,296,530 B2 | 3/2016 | Cockerham et al. | |
| 10,029,705 B2 * | 7/2018 | Schmidt | B61D 5/08 |
| 2001/0007324 A1 | 7/2001 | Hagano et al. | |
| 2002/0021017 A1 | 2/2002 | Foltz | |
| 2004/0074538 A1 | 4/2004 | Ortenzi et al. | |
| 2010/0072774 A1 | 3/2010 | Bar | |
| 2013/0076059 A1 | 3/2013 | Zalan et al. | |
| 2015/0224872 A1 | 8/2015 | Frommann et al. | |
| 2015/0274010 A1 | 10/2015 | Roth et al. | |
| 2016/0375762 A1 | 12/2016 | Lee et al. | |
| 2017/0074413 A1 | 3/2017 | Cockerham | |
| 2018/0274284 A1 * | 9/2018 | Bartha | B60K 15/035 |
| 2018/0274677 A1 * | 9/2018 | Bartha | F16K 24/04 |
| 2019/0017614 A1 * | 1/2019 | Li | B65D 51/165 |

OTHER PUBLICATIONS

International Searching Authority, "Written Opinion," issued in connection with International Patent Application PCT/US2018/023237, dated Jun. 6, 2018, 7 pages.

Enardo, "ES-660 Series Spring-Loaded Hatch," ES-660 Series Instruction Manual, Mar. 2015, 8 pages.

United States Patent and Trademark Office, "Non-Final Office Action", issued in connection with U.S. Appl. No. 151470,501, dated Jan. 29, 2018, 16 pages.

United States Patent and Trademark Office, "Notice of Allowance and Fees Due", issued in connection with U.S. Appl. No. 15/470,501, dated Aug. 16, 2018, 5 pages.

Enardo Hatches, "Model ES-660 and ES-660-L, Thief Hatches," 2 pages, originally published Mar. 2015.

* cited by examiner

APPARATUS TO PROTECT SEALING SURFACES OF THIEF HATCHES

RELATED APPLICATION

This patent arises from a continuation of U.S. patent application Ser. No. 15/470,501 (Now U.S. Pat. No. 10,161,521), which was filed on Mar. 27, 2017. U.S. patent application Ser. No. 15/470,501 is hereby incorporated herein by reference in its entirety. Priority to U.S. patent application Ser. No. 15/470,501 is hereby claimed.

FIELD OF THE DISCLOSURE

This disclosure relates generally to thief hatches and, more particularly, to apparatus to protect sealing surfaces of thief hatches.

BACKGROUND

Thief hatches are hatches mounted to tanks or other fluid containing vessels that often serve the dual purpose of (1) providing access to the contents of such tanks or vessels to thieve or extract samples, measure levels, and/or take other measurements of the contents of the tanks or vessels, and (2) regulating the pressure within such tanks or vessels. Such hatches provide access to the contents of a tank by a cover or lid that may be pivoted about a hinge to an open position, thereby uncovering an aperture in the tank. Some thief hatches regulate pressure in a tank by releasing pressure when the tank pressure exceeds a high pressure threshold and introducing pressure into the tank when the tank pressure drops below a vacuum pressure threshold (e.g., a negative pressure threshold relative to the ambient atmosphere). When the tank pressure is between the high pressure threshold and the vacuum pressure threshold, seals in the closed hatch reduce (e.g., prevent) leakage of fluid out of the tank. While suitable to any application, such pressure regulating hatches are often implemented on tanks in which volatile and/or vaporizable liquids are stored, transported, or otherwise handled.

SUMMARY

Example apparatus to protect sealing surfaces of thief hatches are disclosed herein. An example apparatus includes a first portion that is attachable to a tank, wherein the first portion includes a first opening, and a second portion that is pivotably coupled to the first portion. The example apparatus is structured to provide access to an aperture in the tank via the first opening when the second portion is in an open state and maintain a pressure of the tank within a specified range by selectively separating one or more seals from one or more corresponding sealing surfaces when the second portion is in a closed state, wherein the second portion includes the one or more seals and the one or more corresponding sealing surfaces.

An example apparatus includes a base attachable to a tank around an aperture in the tank, the base having a first opening extending therethrough to provide access to the aperture in the tank, a spacer having a second opening extending therethrough, a rim of the second opening to engage a support surface of the base, the support surface extending about a perimeter of the first opening, and a cover selectively moveable between a closed position covering the aperture and the first and second openings and an open position providing access to the aperture, the spacer separating the cover from the base.

An example apparatus includes a base having a support surface facing away from a tank when the base is mounted to the tank, a spacer directly coupled to the base via a first hinge, a bottom surface of the spacer engaging with the support surface of the base, and a cover directly coupled to the spacer via a second hinge, the spacer disposed between the base and the cover when the cover is in a closed position with a top surface of the spacer supporting the cover.

Figure 1:
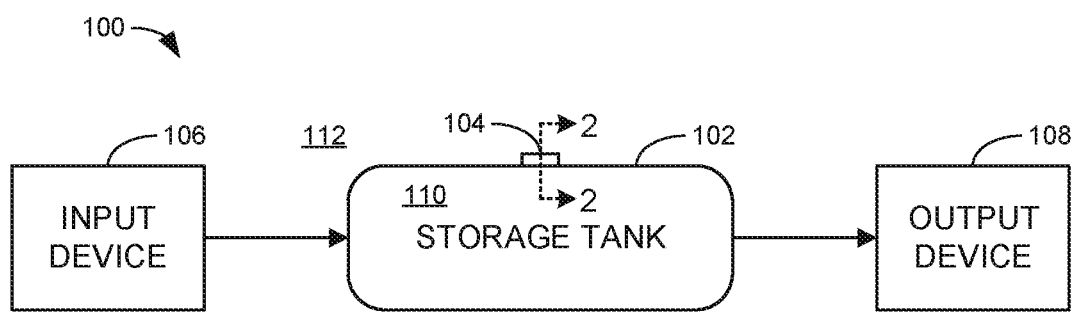
FIG. 1 is a schematic of a storage tank system having an example thief hatch constructed in accordance with the teachings disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Thief hatches typically include a base and a cover or lid coupled to the base via a hinge. The base may be mounted to a tank around an aperture in the tank with the cover selectively enclosing the aperture in a closed position or providing access to the aperture when in an open position. When the cover is open, access to an interior of the tank is possible (through the aperture) to, for example, take measurements and/or extract (thieve) samples of the contents of the tank. Such procedures often involve lowering an appropriate measuring or sampling device into the tank through the aperture via a stick, pole, rope, chain, or other suitable mechanism. When the cover is closed, a seal in the cover engages with the base to seal the aperture, thereby substantially preventing leakage of vapors, liquids, and/or fumes, etc. out of the tank.

In many thief hatches, the seal used to seal the aperture is implemented as part of a pressure regulating assembly. The pressure regulating assembly serves to seal the aperture at tank pressures within an acceptable range relative to an ambient (e.g., atmospheric) pressure but allow pressure to escape the tank or to be introduced into the tank when the tank pressure reaches upper or lower pressure thresholds defining limits of the acceptable range. The pressure regulating assembly is often removably coupled to the cover of the thief hatch such that when the cover is lifted to an open position, the pressure regulating assembly is lifted with cover. As a result, the sealing surface on the base portion of the hatch (used to seal the aperture when the cover is closed) becomes exposed when the cover is opened. In such circumstances, there is a risk that the measuring and/or sampling devices and/or associated implements (e.g., sticks, poles, ropes, chains, etc.) used to lower such devices into the tank may damage the sealing surface of the base. A damaged sealing surface may limit a proper sealing of the aperture once the cover is again closed and the seal of the pressure regulating assembly re-engages with the sealing surface.

Examples disclosed herein protect the sealing surface for the seal of a pressure regulating assembly by providing a means for maintaining the seal in sealing engagement with the sealing surface when a cover is in an open position to provide access to a tank for measurements and/or contents sampling. More particularly, example thief hatches include an intermediate ring or spacer that is disposed between a base of the hatch and the cover of the hatch. In such examples, the seal carried by the cover engages with a sealing surface on the spacer instead of a surface on the base of the hatch. Further, in some such examples, the spacer is coupled to the base via a first hinge to enable the cover to move to an open and closed position in a similar manner to existing hatches except that the cover (and associated seal) remains secured to the spacer. That is, the cover and spacer move together as a single unit to provide access to the aperture when in the open position. As a result, the sealing surface on the spacer remains in sealing engagement with the associated seal even when the cover is in the open position, thereby protecting the sealing surface from potential damage during the measurement and/or retrieval of the contents in the tank.

When the cover and spacer are closed, the spacer is supported on, and sealingly engaged with, a support surface of the base. Thus, although the intermediate spacer (with the associated sealing surface) may be out of the way when accessing the contents of a tank as outlined above, there is still the possibility that the support surface of the base becomes damaged during such procedures. However, this is less of a concern because the interface between the base and the spacer is not associated with the functionality of the pressure regulating assembly that seals the hatch for a certain range of pressures while allowing fluid to pass the seals at other pressures outside of the specific range. Furthermore, imperfections and wear on the support surface of the base may be partially mitigated by clamping the spacer against the base with greater force to produce stronger sealing forces than is possible between the spacer and the cover because of the precise pressure regulating functionality of the pressure regulating assembly seals. In some examples, concerns of damage to the base support surface are further mitigated by designing the base to support a suitable seal between the base and the spacer that is more easily replaceable (and at less cost) than replacing the pressure regulating assembly and/or the base of the hatch as may be needed when existing hatches are damaged.

In some examples, when the spacer is secured to the cover such that the seal of the pressure regulating assembly engages the sealing surface on the spacer, the pressure regulating assembly cannot be removed from the cover for repair, maintenance, or replacement. Accordingly, in some examples, the cover is coupled to the spacer via a second hinge different than the first hinge (coupling the spacer to the base). In such examples, the cover may be moved to the open position via the second hinge independent of the spacer while the spacer remains supported by the base. This will disengage the sealing surface of the spacer from the associated seal of the pressure regulating assembly but frees the pressure regulating assembly to be removed from the cover for maintenance. Thus, example hatches disclosed herein include a cover that may either (1) move in conjunction with a spacer secured thereto (to protect sealing surfaces of a pressure regulating assembly when access to a tank is desired) or (2) move independent of the spacer (to enable the removal and/or maintenance of the pressure regulating assembly).

FIG. 1 is a schematic of a storage tank system 100 having a tank 102 with an example thief hatch 104 mounted thereon. The storage tank system 100 may be a component of a variety of applications. Furthermore, while the tank 102 is described as a storage tank, the tank 102 may be any suitable fluid containing vessel used for any suitable purpose. In the illustrated examples, the tank 102 is coupled to an input device 106 that may pump, discharge, or otherwise introduce a fluid into the tank 102. Similarly, the tank 102 is coupled to an output device 108 to receive or withdraw fluid from the tank 102. The input and output devices 106, 108 may be any type of fluid handling, storage, and/or processing components or equipment that are operatively coupled to the tank 102 substantially permanently or on a selective, temporary, and/or intermittent basis.

When a fluid is stored in the tank 102, pressure may build within the tank 102. For example, the input device 106 may discharge fluid for storage into the tank 102 at an elevated pressure. In some examples, it may be desirable to vent or release pressure within an interior 110 of the tank 102 that is above a threshold pressure (e.g., a high pressure threshold). As such, the tank 102 includes the thief hatch 104, which is configured to open (e.g., periodically open) fluid communication between the interior 110 of the tank 102 and an ambient environment 112 external to the tank 102. In particular, the thief hatch 104 may be configured to open fluid communication between the interior 110 of the tank 102 and the ambient environment 112 surrounding the tank 102 when the pressure within the interior 110 of the tank 102 exceeds an upper threshold pressure. In this manner, vapor, fumes, and/or fluid may be vented from the tank 102, thereby decreasing the internal pressure of the tank 102. Once the internal pressure of the tank 102 falls below the upper threshold pressure, the seal assembly of the thief hatch 104 may automatically close and re-seal, thereby blocking fluid communication between the interior 110 of the tank 102 and the ambient environment 112.

In some instances, pressure may decrease within the tank 102 to form a vacuum (e.g., a negative pressure relative to the ambient environment 112). For example, the output device 108 may pump fluid from the tank 102. In some examples, it may be desirable to reduce an excessive vacuum within the tank 102 by allowing fluid (e.g., air) from the ambient environment 112 to be introduced into the interior 110 of the tank 102 when the pressure is below a threshold pressure (e.g., a vacuum pressure threshold). As such, the thief hatch 104 may be configured to open (e.g., periodically open) fluid communication between the interior 110 of the tank 102 and an ambient environment 112 external to the tank 102 in a similar manner to that described above for excess pressure in the tank 102. Thus, in some examples, the thief hatch 104 regulates the pressure within the tank 102 to be within upper and lower thresholds. In some examples, the thief hatch 104 includes two different seal assemblies that cooperatively operate to selectively open or remain sealed at respective ones of the thresholds limiting the operating range of pressures maintained within the tank 102.

Figure 2:
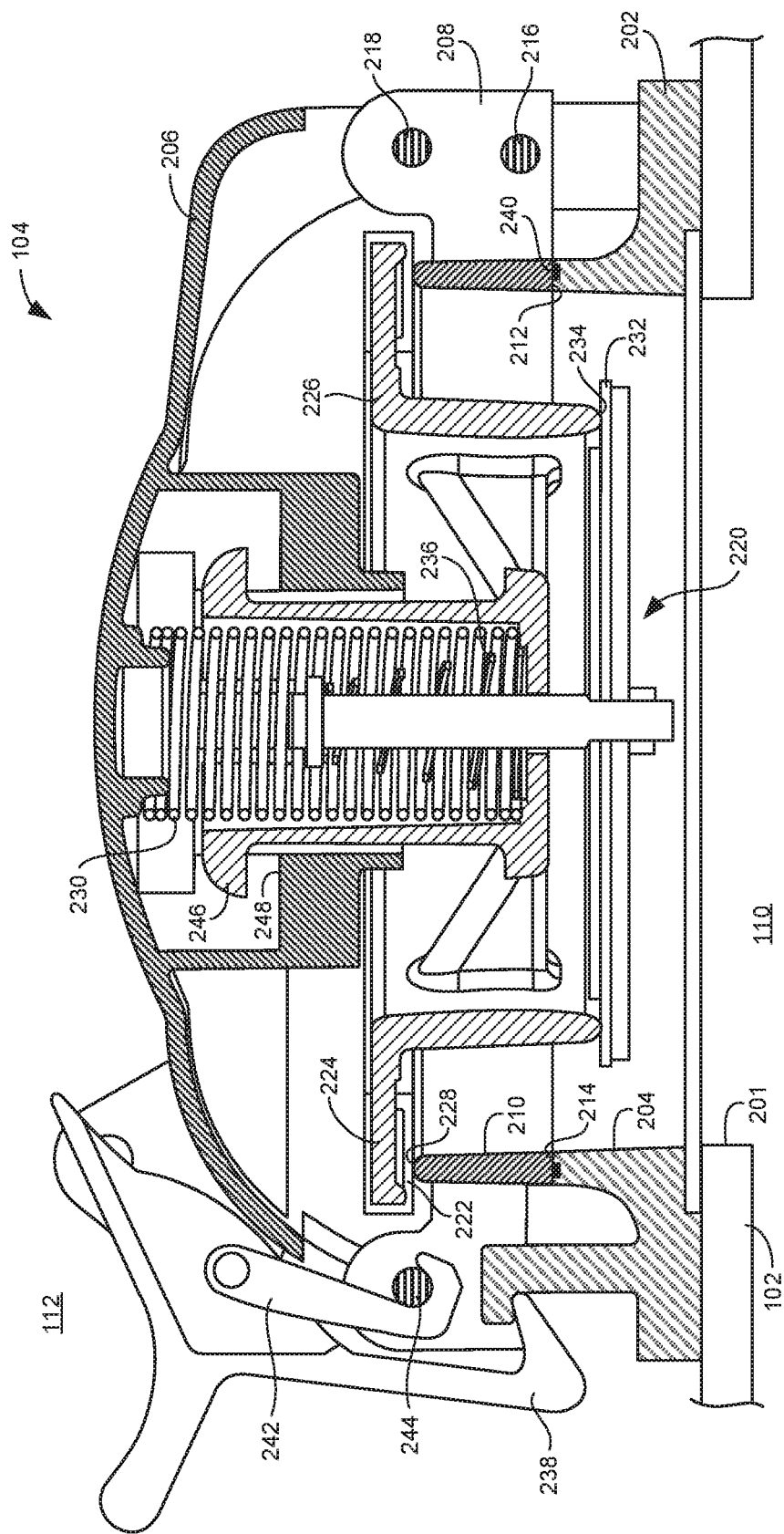
FIG. 2 is a cross-sectional view taken along line 2-2 of the example thief hatch of FIG. 1 in a closed position.

FIG. 2 is a cross-section of the example thief hatch 104 of FIG. 1. In the illustrated example, the thief hatch 104 includes a base 202 mounted around an aperture 201 of the tank 102 of FIG. 1. In the illustrated example, the base 202 includes an opening 204 similar to the aperture 201 to provide access to the interior 110 of the tank 102 to take measurements and/or extract samples of the contents of the tank 102. The hatch 104 of the illustrated example also includes a lid or cover 206 that is separated from the base 202 by a spacer 208. In some examples, the spacer 208 includes an opening 210 similar to the opening 204 of the base 202. As shown in the illustrated example, the spacer 208 includes a bottom surface 212 that is constructed to be supported by or engage with a support surface 214 of the base 202 such that the openings 204, 210 of the base 202 and the spacer 208 are substantially aligned when the spacer 208 is on the base 202. In the illustrated example, the spacer 208 is pivotably coupled to the base 202 via a first hinge 216 (e.g., a pin extending through the base 202 and the spacer 208). Additionally, the cover 206 is pivotably coupled to the spacer 208 via a second hinge 218 (e.g., another pin extending through the spacer 208 and the cover 206). The second hinge 218 enables the cover 206 to be selectively moved to and from an open position independent of the spacer 208 while the first hinge 216 enables the cover 206 and the spacer 208 to be selectively moved as a unit to an open position as described more fully below in connection with FIGS. 3 and 4.

In the illustrated example, the thief hatch 104 includes a pressure regulating assembly 220 removably coupled to the cover 206. The pressure regulating assembly 220 includes a first seal 222 (referred to herein as a pressure seal). The pressure seal 222 is disposed on a flange 224 of a center body 226 of the pressure regulating assembly 220 such that when the cover 206 is in a closed position, the pressure seal 222 is urged against a sealing surface 228 on the spacer 208. In some examples, the pressure seal 222 is a hollow seal with a generally c-shaped cross section to wrap around the flange 224. In some examples, the sealing force for the pressure seal 222 is generated based on a pressure spring 230 compressed between the cover 206 and the center body 226 of the pressure regulating assembly 220. Further, as shown in FIG. 2, the example pressure regulating assembly 220 includes a second seal 232 (referred to herein as a vacuum seal) that is urged against a sealing surface 234 on the center body 226. In some examples, the sealing force for the vacuum seal 232 is generated based on a vacuum spring 236 within the pressure regulating assembly 220 as shown. In some examples, the vacuum seal 232 is a hollow seal.

When both the pressure seal 222 and the vacuum seal 232 are urged against their respective sealing surfaces 228, 234, the tank 102 is sealed from the ambient environment 112 external to the tank 102. However, in some examples, the springs 230, 236 have a strength or rating that causes the respective seals 222, 232 to disengage from their respective sealing surfaces 228, 234 when the pressure in the tank 102 is too high or too low relative to an ambient (e.g., atmospheric) pressure. More particularly, when the tank pressure exceeds an upper threshold, the pressure seal 222 separates from the associated sealing surface 228 to enable pressure within the tank 102 to pass the seal 222 and the cover 206 to the ambient environment 112 exterior to the tank 102. Conversely, when the tank pressure is a vacuum (e.g., a negative pressure) below a lower threshold, the vacuum seal 232 separates from the associated sealing surface 234 to allow pressure to be introduced into the tank 102 from the ambient environment 112 after flowing under the cover 206, through the center body 226, and past the vacuum seal 232.

As shown in the illustrated example, the cover 206 includes a first latch 238 that extends between the cover 206 and the base 202 to secure the cover 206 to the base 202 in a closed position with the spacer 208 sandwiched therebetween. As the pressure spring 230 urges the center body 226 of the pressure regulating assembly 220 downward (towards the tank 102 in the illustrated example) to urge the pressure seal 222 against the associated sealing surface 228, a reactive force urges the cover 206 upwards (away from the tank 102). However, movement of the cover 206 may be prevented due to the latch 238 engaging with the base 202 as shown in FIG. 1, thereby resulting in a relatively strong sealing force acting on the pressure seal 222. In some examples, the force generated by the pressure spring 230 that urges the seal 222 against the sealing surface 228 on the spacer 208 also translates into a sealing force on a base seal 240 disposed between the support surface 214 of the base 202 and bottom surface 212 of the spacer 208. In some examples, the base seal 240 is a hollow seal. In the illustrated example, the base seal 240 is positioned on the support surface 214 of the base 202. In other examples, the base seal 240 may be positioned on and carried by the bottom surface 212 of the spacer 208.

Further, in some examples, the cover includes a second latch 242 that extends between the cover 206 and the spacer 208 to secure the cover 206 to the spacer 208 independent of the base 202. As shown in FIG. 2, the second latch 242 may hook onto a pin 244 on the spacer 208. In some examples, the latch 242 may remain spaced apart from the pin 244 when the first latch 238 is hooked to the base 202. In other examples, as illustrated in FIG. 2, both latches 238, 242 may be hooked to the base 202 and the spacer 208 respectively. While example structures of latching mechanisms are shown in FIG. 1, any other suitable means for securing the cover 206 to the base 202 and securing the cover 206 to the spacer 208 may alternatively be implemented. For example, both of the latches 238, 242 may hook on to respective pins. In other examples, both of the latches 238, 242 may hook on to integrated portions of the respective base 202 and spacer 208. Further, while both of the latches 238, 242 are shown pivotable about a common hinge (e.g., a single pin), in other examples, the latches 238, 242 may be coupled to the cover 206 via separate hinges. Further still, in some examples, the hinges for the latches 238, 242 may be disposed on the base 202 and the spacer 208 with ends that hook or latch on to the cover 206.

Figure 3:
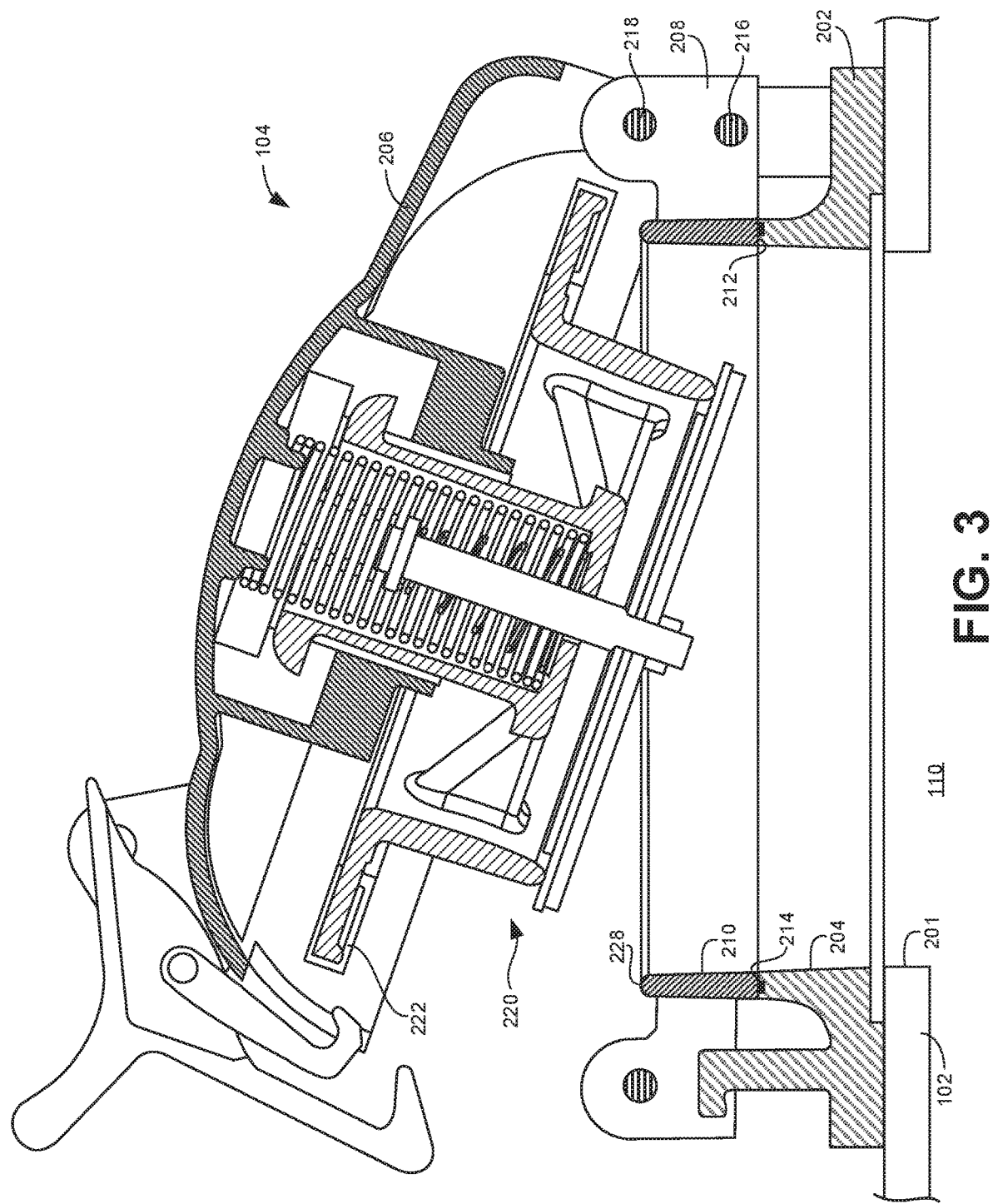
FIG. 3 is a cross-sectional view taken along line 2-2 of the example thief hatch of FIG. 1 in a first open position enabling removal of the pressure regulating assembly of the hatch.

As mentioned above, the pressure regulating assembly 220 may be removable from the thief hatch 104. This is useful for maintenance, repair, and/or replacement of one or more parts of the assembly. In some examples, rotating the center body 226 of the pressure regulating assembly 220 enables protrusions 246 on the center body 226 to bypass a shoulder 248 formed in the cover 206, thereby enabling the assembly 220 to come free of the cover 206. However, removing the pressure regulating assembly 220 in this manner is not possible when the cover 206 is engaged with the spacer 208 because the pressure seal 222 (and the associated flange 224) are blocked from movement (e.g., removal) by the sealing surface 228 on the spacer 208. Accordingly, as shown in FIG. 3, the cover 206 may be moved to an open position via the second hinge 218 to unseat the pressure seal 222 from the sealing surface 228 and free the pressure regulating assembly 220 to be removed from the cover for maintenance, repair, and/or replacement. In the illustrated example of FIG. 3, the spacer 208 remains on the base 202 by the force of gravity. In other examples, a third latch may secure the spacer 208 to the base 202 independent of the other latches 238, 242.

In addition to being able to remove the pressure regulating assembly 220 when the cover 206 is moved as shown in the illustrated example of FIG. 3, opening the cover 206 also provides access to the interior 110 of the tank 102 through the openings 204, 210 of the base 202 and spacer 208. However, as shown in the illustrated example of FIG. 3, with the cover 206 removed from the spacer 208, the sealing surface 228 on the spacer 208 is exposed as the upper surface or rim of the opening 210. Thus, while it is possible to access the contents of the tank 102 through the opening 210 of the spacer 208, there is a possibility that doing so may damage the sealing surface 228. As a result, when the cover 206 is subsequently closed, the ability of the pressure seal 222 to properly engage with the sealing surface 228 on the spacer 208 may be compromised making the thief hatch 104 less reliable to seal and/or regulate pressure within the tank 102.

Figure 4:
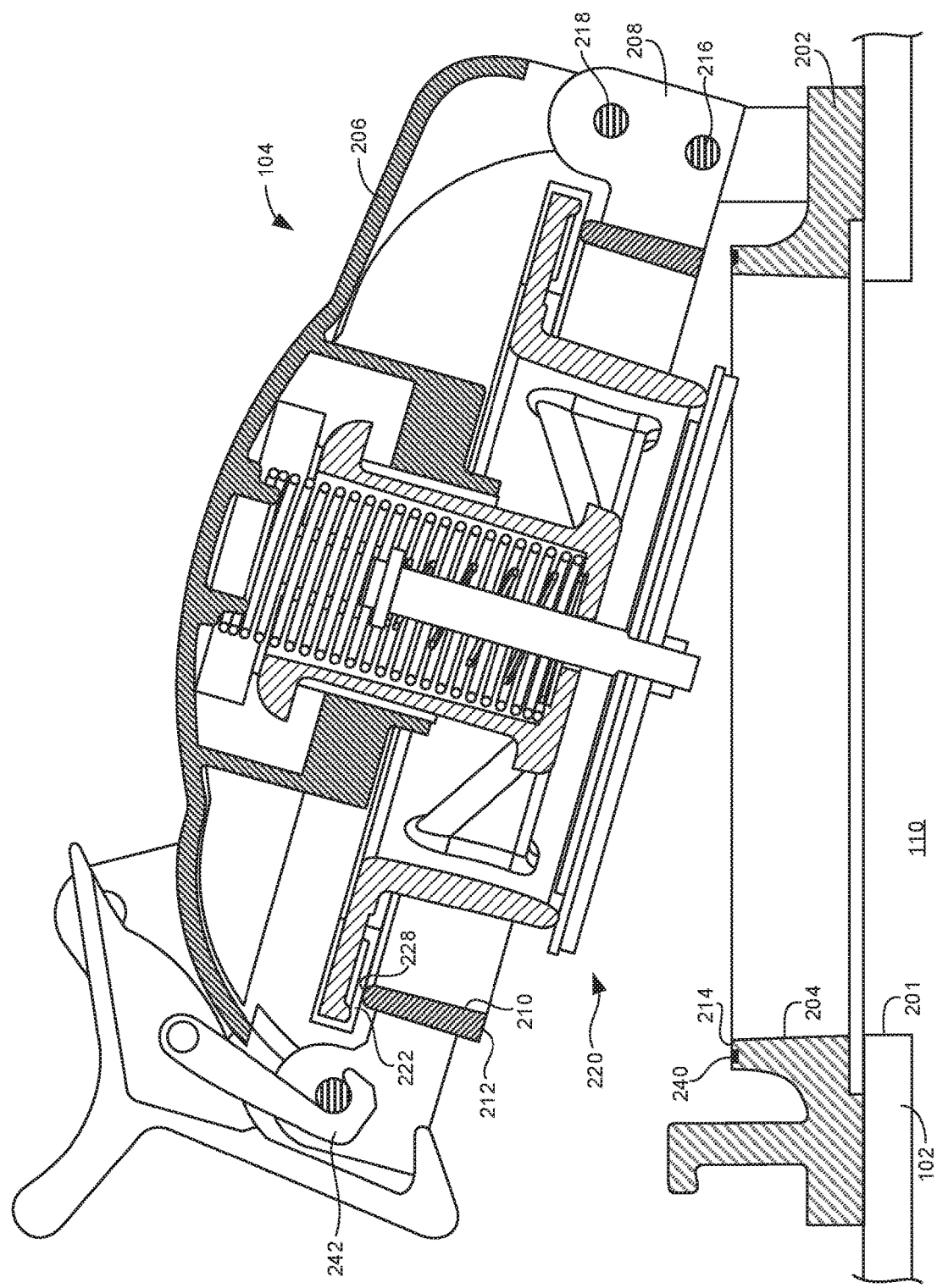
FIG. 4 is a cross-sectional view taken along line 2-2 of the example thief hatch of FIG. 1 in a second open position providing access to the interior of the tank while protecting the pressure regulating assembly.

Accordingly, in some examples, the thief hatch 104 is constructed to enable the cover 206 to be moved to an open position while remaining secured to the spacer 208 as shown in FIG. 4. That is, in the illustrated examples, the cover 206 and the spacer 208 may pivot as a unit about the first hinge 216. In such situations, the pressure seal 222 remains engaged with the sealing surface 228 on the spacer 208, thereby protecting the sealing surface 228 from being damaged when a person seeks to access the interior 110 of the tank 102 through the aperture 201 of the tank 102 and the opening 204 of the base 202. As shown in FIG. 4, the cover 206 and the spacer 208 are secured together via the second latch 242 that extends from the cover 206 to the spacer 208.

While the pressure seal 222 remains engaged with the sealing surface 228 on the spacer 208, as shown in the illustrated example of FIG. 4, the bottom surface 212 of the spacer 208 separates from the support surface 214 of the base 202 when the cover 206 and the spacer 208 are moved to an open position as a unit. Thus, the support surface 214 becomes exposed such that there is a risk of damage to the surface 214 during a thieving procedure or other procedure to measure the contents of the tank 102. Such damage may reduce the ability of the bottom surface 212 of the spacer 208 to properly seal against the support surface 214 of the base 202 undermining the ability of the thief hatch 104 to seal and/or control the pressure of the tank 102 via the pressure regulating assembly 220. However, this concern may be largely mitigated against by including the base seal 240 disposed between the support surface 214 of the base 202 and bottom surface 212 of the spacer 208 to provide an adequate seal, even if the support surface 214 of the base is worn down. Furthermore, ff the base seal 240 becomes damaged or otherwise ineffective, the base seal 240 may be replaced much more easily and cost effectively than repairing and/or replacing the sealing surface 228 on the spacer 208 if damaged as described above.

While an example thief hatch 104 is shown and described in the figures, many variations to the structure are possible. For example, inasmuch as access to the interior 110 of the tank 102 is possible through the opening 204 in the base 202 when the spacer 208 is secured to the cover 206 (as shown in FIG. 4), the opening 210 in the spacer 208 does not necessarily have to align with, or be similar to, the opening 204 of the base 202. For instance, in some examples, the spacer 208 may have an internal shape that, at least partially, encloses or otherwise protects the pressure regulating assembly 220 when the cover 206 and spacer 208 are moved to an open position. Further, while the pressure regulating assembly 220 extends beyond the bottom surface 212 of the spacer 208 in the illustrated examples, in other examples, the spacer 208 may extend further away from the cover 206 than the pressure regulating assembly 220.

Furthermore, the location of the hinges 216, 218 relative to one another may be different than as shown in the illustrated examples because the use of the first hinge 216 is for one purpose (to provide access to the interior 110 of the tank 102 while protecting the sealing surfaces of the pressure regulating assembly 220) while the second hinge 218 is for a second independent purpose (to enable removal of the pressure regulating assembly 220). Thus, in some examples, the second hinge 218 may be positioned on the opposite side of the thief hatch 104 so that the cover 206 opens in one direction (with the spacer 208) to enable access to the interior 110 of the tank 102 and opens in another direction (without the spacer 208) to enable removal of the pressure regulating assembly 220. The hinges 216, 218 may be located at any relative position about the circumference of the base 202. Of course, in such examples, the latches 238, 242 may be correspondingly located at points on the cover 206 opposite to the appropriate hinge to enable the cover 206 to be secured to the base 202 and/or the spacer 208 as needed.

From the foregoing, it will be appreciated that the above disclosed apparatus enable the opening of a thief hatch to provide access to an interior of a tank in a manner that protects the sealing surfaces of a pressure regulating assembly by maintaining the sealing surfaces in sealing engagement with their respective seals while still enabling the separation of the pressure regulating assembly from its sealing surfaces when the pressure regulating assembly needs to be removed for repairs, maintenance, and/or replacement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a first portion that is attachable to a tank, wherein the first portion includes a first opening;
   a second portion that is pivotably coupled to the first portion, wherein the apparatus is structured to:
   provide access to an aperture in the tank via the first opening when the second portion is in an open state; and
   maintain a pressure of the tank within a specified range by selectively separating one or more seals from one or more corresponding sealing surfaces when the second portion is in a closed state, wherein the second portion includes the one or more seals and the one or more corresponding sealing surfaces.

2. The apparatus of claim 1, wherein the second portion further includes:
   a lower portion pivotably coupled to the first portion via a first hinge; and
   an upper portion pivotably coupled to the lower portion via a second hinge.

3. The apparatus of claim 2, wherein the first hinge and the second hinge are positioned adjacent one another on the lower portion.

4. The apparatus of claim 2, further including a first latch to secure the upper portion to the lower portion.

5. The apparatus of claim 4, wherein the lower portion and the upper portion are pivotable about the first hinge as a unit when the upper portion is secured to the lower portion via the first latch.

6. The apparatus of claim 4, further including a second latch to secure the second portion in the closed state, the lower portion secured between the upper portion and the first portion when the second portion is in the closed state.

7. The apparatus of claim 1, wherein the one or more seals and the one or more corresponding sealing surfaces forms a pressure regulating assembly, the pressure regulating assembly removably coupled to the second portion.

8. The apparatus of claim 7, wherein the pressure regulating assembly includes:
   a first seal; and
   a first biasing element to urge the first seal against a first sealing surface when the second portion is secured in the closed state.

9. The apparatus of claim 8, wherein the first biasing element is disposed between the second portion and a center body of the pressure regulating assembly, the first biasing element to urge the second portion away from the first portion.

10. The apparatus of claim 8, wherein when the pressure in the tank exceeds an upper threshold of the specified range, the first seal is urged away from the first sealing surface to reduce pressure within the tank.

11. The apparatus of claim 8, wherein the pressure regulating assembly further includes:
    a second seal; and
    a second biasing element to urge the second seal against a second sealing surface when the second portion is secured in the closed state.

12. The apparatus of claim 11, wherein when the pressure in the tank is below a lower threshold of the specified range, the second seal is urged away from the second sealing surface to increase pressure within the tank.

13. An apparatus, comprising:
    a base attachable to a tank around an aperture in the tank, the base having a first opening extending therethrough to provide access to the aperture in the tank;
    a spacer having a second opening extending therethrough, a rim of the second opening to engage a support surface of the base, the support surface extending about a perimeter of the first opening;
    a cover selectively moveable between a closed position covering the aperture and the first and second openings and an open position providing access to the aperture, the spacer separating the cover from the base;
    a first latch to secure the cover to the spacer; and
    a second latch to secure the cover to the base with the spacer disposed therebetween.

14. The apparatus of claim 13, further including:
    a first hinge to pivotably couple the base and the spacer; and
    a second hinge to pivotably couple the spacer and the cover.

15. The apparatus of claim 14, wherein the cover is pivotable to an open position via the second hinge while the spacer remains engaged with the support surface of the base.

16. The apparatus of claim 15, wherein the first hinge and the second hinge are disposed adjacent one another on the spacer.

17. An apparatus, comprising:
    a base having a support surface facing away from a tank when the base is mounted to the tank;
    a spacer directly coupled to the base via a first hinge, a bottom surface of the spacer engaging with the support surface of the base; and
    a cover directly coupled to the spacer via a second hinge, the spacer disposed between the base and the cover when the cover is in a closed position with a top surface of the spacer supporting the cover, wherein the cover and the spacer are pivotable, as a unit, via the first hinge to an open position spaced apart from the support surface of the base.

18. The apparatus of claim 17, wherein the cover is pivotable to an open position via the second hinge while the spacer remains engaged with the support surface of the base.

* * * * *